(12) United States Patent
Tracy et al.

(10) Patent No.: US 12,358,232 B2
(45) Date of Patent: Jul. 15, 2025

(54) ADAPTIVE MANUFACTURING USING STRUCTURED LIGHT DATA

(71) Applicant: Pratt & Whitney Canada Corp., Longueuil (CA)

(72) Inventors: Kevin M. Tracy, Wichita Falls, TX (US); Charles Trent Daulton, Burkburnett, TX (US)

(73) Assignee: Pratt & Whitney Canada Corp., Longueuil (CA)

( * ) Notice: Subject to any disclaimer, the term of this patent is extended or adjusted under 35 U.S.C. 154(b) by 363 days.

(21) Appl. No.: 17/942,067

(22) Filed: Sep. 9, 2022

(65) Prior Publication Data

US 2024/0083118 A1     Mar. 14, 2024

(51) Int. Cl.
| | | |
|---|---|---|
| B29C 64/393 | (2017.01) |
| B29C 64/153 | (2017.01) |
| B29C 64/209 | (2017.01) |
| B33Y 10/00 | (2015.01) |
| B33Y 50/02 | (2015.01) |

(52) U.S. Cl.
CPC .......... *B29C 64/393* (2017.08); *B29C 64/153* (2017.08); *B29C 64/209* (2017.08); *B33Y 10/00* (2014.12); *B33Y 50/02* (2014.12)

(58) Field of Classification Search
None
See application file for complete search history.

(56) References Cited

U.S. PATENT DOCUMENTS

| | | |
|---|---|---|
| 8,140,179 B2 | 3/2012 | Drechsler |
| 8,910,361 B2 | 12/2014 | Rickenbacher |
| 9,174,312 B2 | 11/2015 | Baughman |
| 9,505,172 B2 | 11/2016 | Ljungblad |
| 9,764,517 B2 | 9/2017 | Potter |
| 9,902,024 B2 | 2/2018 | Ernst |
| 10,814,439 B2 | 10/2020 | Ozturk |
| 11,097,350 B2 | 8/2021 | Twelves, Jr. |

(Continued)

FOREIGN PATENT DOCUMENTS

| | | |
|---|---|---|
| CN | 103753098 B | 8/2016 |
| DE | 102019203796 A1 | 9/2020 |

(Continued)

OTHER PUBLICATIONS

EP Search Report for EP Patent Application No. 23196313.3 dated Feb. 8, 2024.

*Primary Examiner* — Ryan A Jarrett
(74) *Attorney, Agent, or Firm* — Getz Balich LLC (57) ABSTRACT

A method is disclosed for providing a component. During this method, braze powder is additively deposited with a substrate. The braze powder is sintered together during the depositing of the braze powder to provide the substrate with sintered braze material. The sintered braze material is heated to melt the sintered braze material and to diffusion bond the sintered braze material to the substrate to provide braze filler material. A first object is scanned using structured light to provide first object scan data. The first object includes the substrate and the braze filler material diffusion bonded to the substrate. The first object scan data is compared to first object reference data to provide machining data. The first object is machined using the machining data to provide a second object.

20 Claims, 5 Drawing Sheets

(56) References Cited

U.S. PATENT DOCUMENTS

| | | | |
|---|---|---|---|
| 11,285,538 | B2 | 3/2022 | Shi |
| 11,305,353 | B2 | 4/2022 | Geisen |
| 2006/0163323 | A1 | 7/2006 | Pietruska |
| 2007/0228108 | A1 | 10/2007 | Goldschmidt |
| 2009/0026182 | A1* | 1/2009 | Hu .................... B23K 1/0056 219/121.64 |
| 2015/0217415 | A1 | 8/2015 | Andolfi |
| 2015/0298258 | A1* | 10/2015 | Arjakine ............... B05B 7/228 219/76.1 |
| 2017/0226860 | A1 | 8/2017 | Aschermann |
| 2018/0243866 | A1* | 8/2018 | Srinivasan ............... F01D 9/04 |
| 2018/0281125 | A1 | 10/2018 | Burbaum |
| 2021/0069832 | A1 | 3/2021 | Burbaum |
| 2021/0299802 | A1 | 9/2021 | Shin |
| 2022/0212396 | A1 | 7/2022 | Tardif |
| 2022/0212397 | A1 | 7/2022 | Edy |
| 2023/0294221 | A1* | 9/2023 | Heinrich .............. B29C 64/393 29/889.1 |

FOREIGN PATENT DOCUMENTS

| | | |
|---|---|---|
| EP | 3933527 A1 | 1/2022 |
| FR | 3103401 B1 | 7/2023 |
| JP | 2009025119 A | 2/2009 |
| WO | 2015161980 A1 | 10/2015 |
| WO | 2019177607 A1 | 9/2019 |

\* cited by examiner

ADAPTIVE MANUFACTURING USING STRUCTURED LIGHT DATA

TECHNICAL FIELD

This disclosure relates generally to manufacturing a component using additive manufacturing.

BACKGROUND INFORMATION

Defects in a component may be overhauled using braze filler material or weld filler. Various processes are known in the art for applying braze filler material and for welding filler material to a component. While these known processes have various advantages, there is still room in the art for improvement. In particular, there is a need in the art for overhaul processes which can reduce material waste and/or decrease formation of secondary (process related) defects in a substrate of the component.

SUMMARY

According to an aspect of the present disclosure, a method is disclosed for providing a component. During this method, braze powder is additively deposited with a substrate. The braze powder is sintered together during the depositing of the braze powder to provide the substrate with sintered braze material. The sintered braze material is heated to melt the sintered braze material and to diffusion bond the sintered braze material to the substrate to provide braze filler material. A first object is scanned using structured light to provide first object scan data. The first object includes the substrate and the braze filler material diffusion bonded to the substrate. The first object scan data is compared to first object reference data to provide machining data. The first object is machined using the machining data to provide a second object.

According to another aspect of the present disclosure, another method is disclosed for providing a component. During this method, a substrate is scanned using a structured light device to provide substrate scan data. The substrate scan data is compared to substrate reference data to provide additive manufacturing data. Braze powder is deposited with the substrate using an additive manufacturing device based on the additive manufacturing data. The braze powder is sintered to provide the substrate with sintered braze material. The sintered braze material is heated to melt the sintered braze material and to diffusion bond the sintered braze material to the substrate to provide braze filler material. A first object is scanned using the structured light device to provide first object scan data. The first object includes the substrate and the braze filler material diffusion bonded to the substrate. The first object scan data is compared to first object reference data to provide machining data. The first object is machined using the machining data to provide a second object.

According to still another aspect of the present disclosure, a system is disclosed for providing a component that includes a substrate. The system includes a scanning device, a controller, an additive manufacturing device, a furnace and a machining device. The scanning device is configured to scan the substrate using structured light to provide substrate scan data indicative of one or more characteristics of the substrate. The scanning device is also configured to scan a first object using the structured light to provide first object scan data indicative of one or more characteristics of the first object. The controller is configured to compare the substrate scan data to substrate reference data to provide additive manufacturing data. The controller is configured to compare the first object scan data to first object reference data to provide machining data. The additive manufacturing device is configured to deposit braze powder with the substrate based on the additive manufacturing data. The braze powder is sintered using a laser of the additive manufacturing device during the depositing of the braze powder to provide the substrate with sintered braze material. The furnace is configured to melt the sintered braze material to facilitate diffusion bonding of the sintered braze material to the substrate to provide the first object. The machining device is configured to machine the first object based on the machining data.

The substrate reference data may be or otherwise include data from a specification for the component.

The first object reference data may be or otherwise include the substrate scan data.

The structured light may be structured white light.

The structures light may be structured blue light.

The braze powder may be deposited using an additive manufacturing device.

The method may also include: scanning the substrate using structured light to provide substrate scan data; and comparing the substrate scan data to substrate reference data to provide additive manufacturing data. The braze powder may be deposited with the substrate based on the additive manufacturing data.

The substrate reference data may be or otherwise include data from a design specification for the component.

The depositing of the braze powder may include: directing the braze powder towards the substrate through a nozzle; and sintering the braze powder using a laser beam.

The laser beam may be directed towards the substrate through an inner bore of the nozzle.

The machining may remove some of the braze filler material diffusion bonded to the substrate.

The braze powder may include metal alloy powder and braze material powder with a lower melting point than the metal alloy powder.

The metal alloy powder and the substrate may be configured from or otherwise include a common metal alloy.

The heating of the sintered braze material may be performed in a vacuum furnace subsequent to the depositing of the braze powder.

The braze powder may be deposited with the substrate to form a cladding over the substrate.

The method may also include receiving a damaged component previously installed within an engine. The depositing, the heating and the machining may be performed to repair the damaged component to provide the component.

The method may also include depositing a coating on the second object.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes systems and methods for adaptively manufacturing or otherwise providing a component. Herein, the term "manufacturing" may describe a process for forming the component; e.g., creating a brand new component. The term "manufacturing" may also or alternatively describe a process for overhauling (e.g., repairing) the component; e.g., restoring one or more features of a previously formed component to brand new condition, similar to brand new condition or better than brand new condition. The component, for example, may be overhauled to fix one or more defects (e.g., cracks, wear and/or other damage) imparted during previous use of the component. The component may also or alternatively be overhauled to fix one or more defects imparted during the initial formation of the component. For ease of description, however, the manufacturing systems and methods may be described below with respect to overhauling the component.

The component may be any stationary component within a hot section of the gas turbine engine; e.g., a combustor section, a turbine section or an exhaust section. Examples of the stationary component include, but are not limited to, a vane, a platform, a gas path wall, a liner and a shroud. The present disclosure, however, is not limited to stationary component applications. The engine component, for example, may alternatively be a rotor blade; e.g., a turbine blade. The present disclosure is also not limited to hot section engine components. For ease of description, however, the manufacturing systems and methods may be described below with respect to overhauling a gas turbine engine component such as a turbine vane or other stators within the turbine section.

The component may be included in various gas turbine engines. The component, for example, may be included in a geared gas turbine engine where a gear train connects one or more shafts to one or more rotors in a fan section, a compressor section and/or any other engine section. Alternatively, the component may be included in a direct-drive gas turbine engine configured without a gear train. The component may be included in a gas turbine engine configured with a single spool, with two spools, or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines. Furthermore, it is contemplated the manufacturing systems and methods of the present disclosure may alternatively be used to manufacture component(s) for non-gas turbine engine applications; e.g., for reciprocating piston internal combustion engine applications, for rotary internal combustion engine applications, etc.

Figure 1:
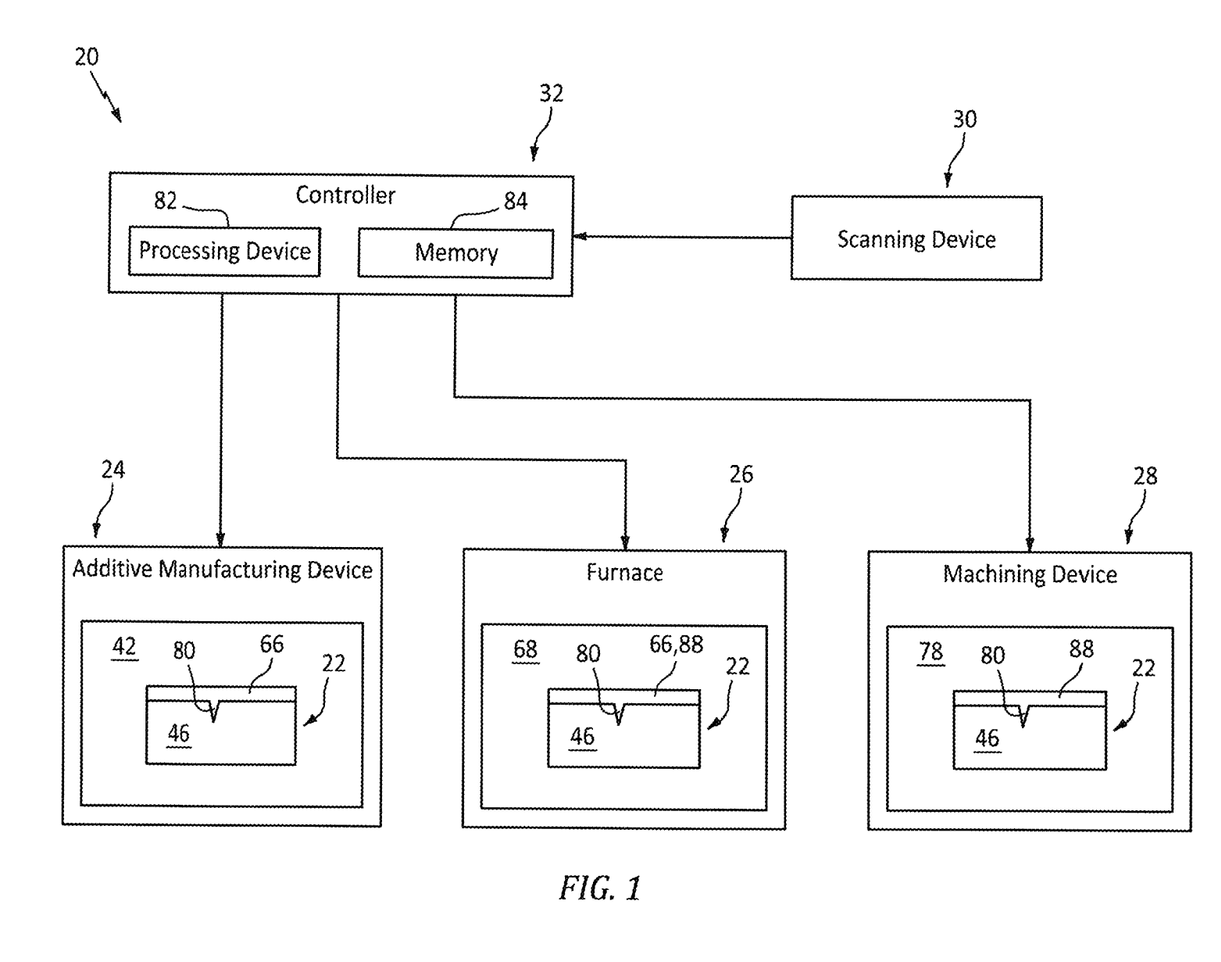
FIG. 1 is a schematic illustration of a system for adaptively manufacturing a component.

FIG. 1 schematically illustrates an exemplary system 20 for adaptively manufacturing (e.g., overhauling or forming) the component 22. This manufacturing system 20 includes an automated additive manufacturing (AM) device 24 (e.g., a three-dimensional (3D) printer), a furnace 26, an automated machining device 28 (e.g., a computer numerical control (CNC) machining device) and a scanning device 30. The manufacturing system 20 of FIG. 1 also includes a controller 32 in signal communication (e.g., hardwired and/or wirelessly coupled) with one or more or all of the other manufacturing system components 24, 26, 28 and 30.

Figure 2:
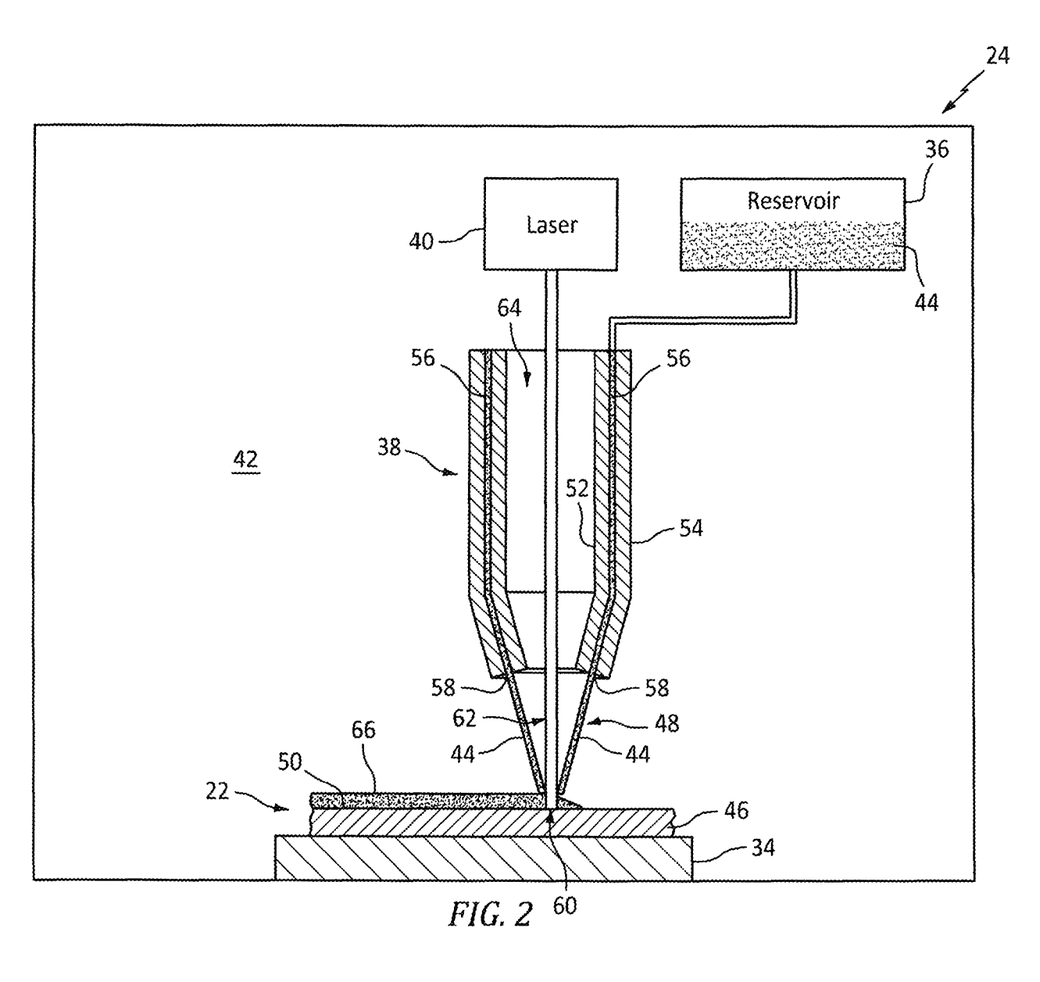
FIG. 2 is a schematic illustration of an additive manufacturing device.

Referring to FIG. 2, the additive manufacturing device 24 may be configured as a laser material deposition device. More particularly, the additive manufacturing device 24 may be configured as a direct laser braze cladding (DLBC) device. The additive manufacturing device 24 of FIG. 2, for example, includes a component support 34, a material reservoir 36, a nozzle 38 and a laser 40.

The component support 34 is located within an internal build chamber 42 of the additive manufacturing device 24. This component support 34 is configured to support the component 22 within the build chamber 42. The component 22, for example, may be placed on top of the component support 34. The component 22 may also or alternatively be mounted to the component support 34 via a fixture, which fixture may arrange the component 22 in a fixed position and/or in a known spatial orientation within the build chamber 42.

The material reservoir 36 is configured to store a quantity of braze powder 44 formed from braze material. This material reservoir 36 is also configured to supply the braze powder 44 to the nozzle 38 during additive manufacturing device operation. Examples of the material reservoir 36 include, but are not limited to, a tank, a hopper and a bin.

The nozzle 38 is configured to deliver the braze powder 44 received from the material reservoir 36 to a substrate 46 of the component 22 during additive manufacturing device operation. More particularly, the nozzle 38 is configured to direct a (e.g., annular, conical) stream 48 of the braze powder 44 towards (e.g., to) a surface 50 of the substrate 46. The nozzle 38 of FIG. 2, for example, includes a tubular inner sidewall 52 and a tubular outer sidewall 54. The outer sidewall 54 extends axially along and circumscribes the inner sidewall 52 so as to form a passage 56 (e.g., an annulus) between the inner sidewall 52 and the outer sidewall 54. This passage 56 is fluidly coupled with an outlet from the material reservoir 36, and the passage 56 extends axially within the nozzle 38 to a (e.g., annular) nozzle orifice 58. A distal end portion of the nozzle 38 and its inner sidewall 52 and its outer sidewall 54 may radially taper inwards as the nozzle 38 extends axially towards (e.g., to) the nozzle orifice 58. With such an arrangement, the nozzle 38 may focus the braze powder 44 to, around or about a target point 60 on, slightly above or slightly below the substrate surface 50. However, in alternative embodiments, the nozzle 38 may be configured to deliver the braze powder 44 through an internal bore rather than an annulus.

The laser 40 is configured to generate a laser beam 62 for sintering the braze powder 44 delivered by the nozzle 38 together and to the substrate 46. Herein, the term "sintering" may describe a process for coalescing powder particles together into a (e.g., porous) mass by heating without (e.g., partial or complete) liquification of the powder. This is in contrast to, for example, a powder laser welding process where powder is melted to a liquid state (e.g., in a melt pool) by a laser beam and then solidified as a solid mass. The laser 40 of FIG. 2 is configured to direct the laser beam 62 to or about the target point 60, where the laser beam 62 may be incident with and is operable to heat up the braze powder 44 for sintering. The laser beam 62 of FIG. 2 is directed through an (e.g., central) internal bore 64 of the nozzle 38, which internal nozzle bore 64 may be formed by the inner sidewall 52. However, in other embodiments, the laser 40 may be configured to direct the laser beam 62 outside of the nozzle 38 or along another path through the nozzle 38.

Referring to FIG. 1, the furnace 26 is configured to receive the substrate 46 with the sintered braze material 66 within an internal treatment chamber 68 of the furnace 26. The furnace 26 is further configured to subject the substrate 46 and the sintered braze material 66 to a heat cycle, for example under vacuum and/or in a partial pressure inert gas (e.g., argon (Ar) gas) environment. During this heat cycle, the sintered braze material 66 may melt and diffusion bond to the substrate 46. An example of the furnace 26 is a vacuum furnace.

Figure 3:
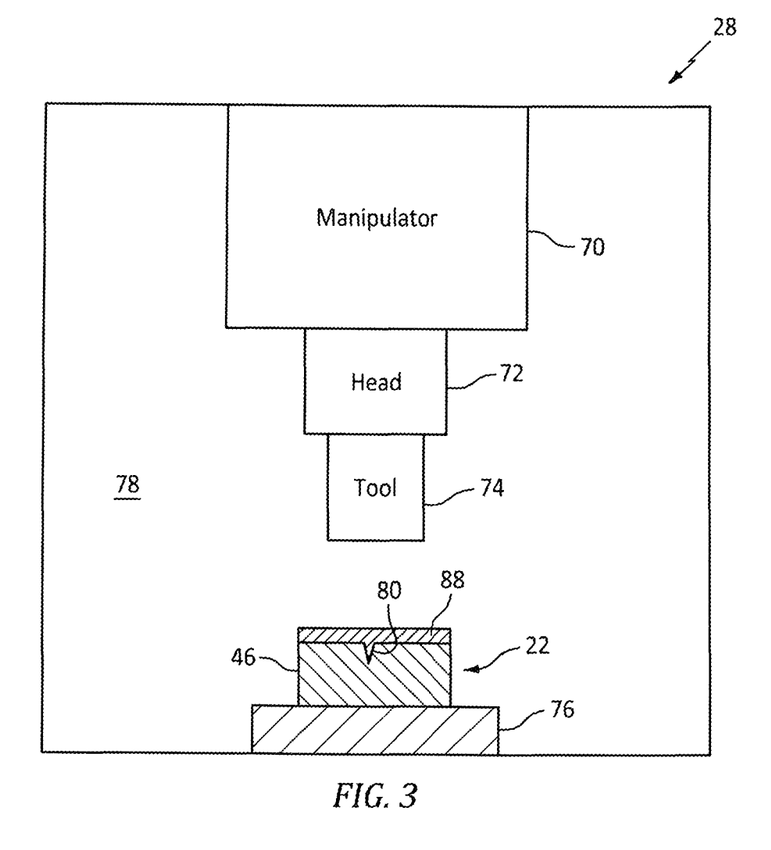
FIG. 3 is a schematic illustration of a machining device.

Referring to FIG. 3, the machining device 28 includes a manipulator 70, a head 72 and at least one machining tool 74 mated with the head 72. The machining device 28 of FIG. 3 also includes a component support 76, which may be the same as or similar to the component support 34 of FIG. 2. The manipulator 70 is configured to move the head 72 and the machining tool 74 within an internal machining chamber 78 of the machining device 28 relative to the component 22. The manipulator 70, for example, may be a multi-axis (e.g., 3-axis, 5-axis, 7-axis, etc.) manipulator such as, but not limited to, a robotic arm and/or a gantry system. The head 72 is configured to hold the machining tool 74. The head 72 is also configured to facilitate actuation of the machining tool 74; e.g., rotate the machining tool 74 about an axis. The machining tool 74 is configured to machine the component 22; e.g., remove material from the component 22. Examples of the machining tool 74 include, but are not limited to, a drill bit, a milling bit, a milling cutter, a grinding bit, a sanding bit and a polishing bit. In another example, the machining tool 74 may be a lathe bit where, for example, the component 22 is moved (e.g., rotated) relative to the machining tool 74. The present disclosure, however, is not limited to such an exemplary machining device with one or more machining tools; e.g., rotatable bits. For example, in other embodiments, the machining device 28 may also or alternatively include a laser to laser machine the component 22 within the machining chamber 78 and/or an electrical discharge machining (EDM) device to machine the component 22 within the machining chamber 78.

The scanning device 30 of FIG. 1 is configured to map a surface geometry of, one or more dimensions of and/or one or more spatial coordinates for a portion (or multiple portions) of or an entirety of an exterior of the component 22. Briefly, the term "map" may describe a process of determining (e.g., measuring) and collecting certain information. The scanning device 30 may also be configured to map a geometry of, one or more dimensions of and/or one or more spatial coordinates for a feature (or multiple features) projecting into the component 22; e.g., an opening to a void 80 such as, but not limited to, a crack, a fracture, a slice, a gouge, a dimple, etc. The scanning device 30 of FIG. 1, in particular, is configured as a structured light scanning device; e.g., a structured white light scanning device or a structured blue light scanning device. This scanning device 30 is configured to project a pattern of light (e.g., structured white light, structured blue light) onto the component 22 using one or more light projectors, which pattern of light may be formed by white light (e.g., with a wavelength between 400-700 nm) or blue light (e.g., with a wavelength between 450-495 nm). The scanning device 30 is configured to pick up (e.g., image, capture, detect, etc.) distortions in the pattern of light against the exterior of the component 22 using one or more imaging devices; e.g., cameras. The scanning device 30 is further configured to map the component 22 based on the distortions in the pattern of light.

The controller 32 may be implemented with a combination of hardware and software. The hardware may include at least one processing device 82 and a memory 84, which processing device 82 may include one or more single-core and/or multi-core processors. The hardware may also or alternatively include analog and/or digital circuitry other than that described above.

The memory 84 is configured to store software (e.g., program instructions) for execution by the processing device 82, which software execution may control and/or facilitate performance of one or more operations such as those described below. The memory 84 may be a non-transitory computer readable medium. For example, the memory 84 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 4:
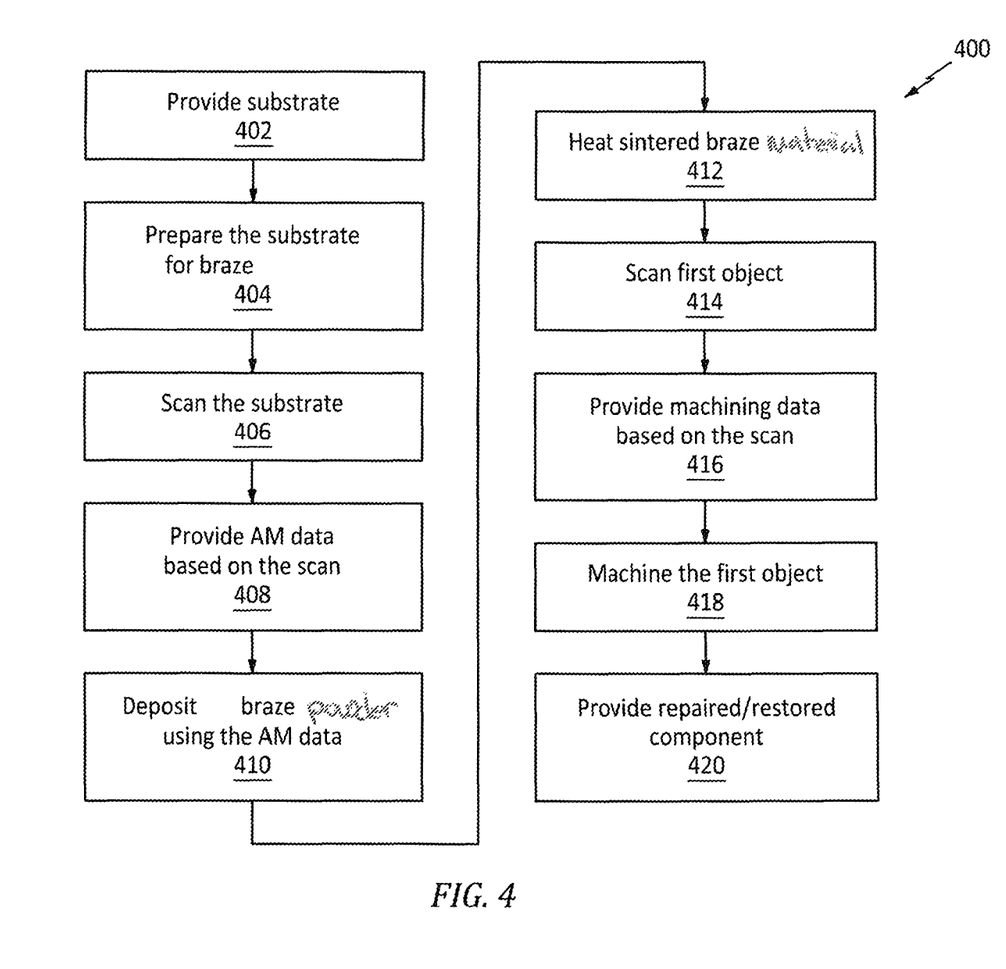
FIG. 4 is a flow diagram of an adaptive method for manufacturing the component.

FIG. 4 is a flow diagram of an exemplary adaptive method 400 for manufacturing (e.g., overhauling or forming) the component 22. For ease of description, the manufacturing method 400 is described with respect to the manufacturing system 20 and overhauling the component 22. The manufacturing method 400, however, is not limited to any particular manufacturing system types or configurations. Furthermore, some or all of the method steps may alternatively be performed to form a new component.

Figure 5:
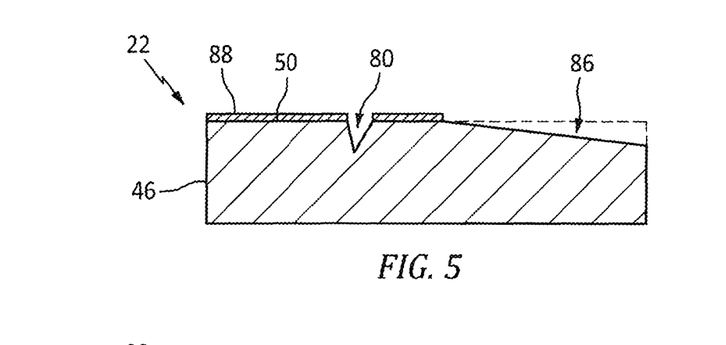
FIGS. 5-10 are partial sectional illustrations of the component during various steps of the adaptive manufacturing method.

In step 402, referring to FIG. 5, the substrate 46 is provided. For ease of description, this substrate 46 is described as part of a damaged component; e.g., a worn and/or cracked component previously installed within an engine. For example, the component 22 of FIG. 5 includes at least one void 80. This void 80 projects partially into the component 22 and its substrate 46 from the exterior of the component 22. The component 22 of FIG. 5 also includes a wear region 86 where a portion of the component 22 and its substrate 46 has been worn away due to, for example, erosion, rubbing and/or otherwise. Of course, in other embodiments, the component 22 may include multiple voids 80, multiple wear regions 86, the void(s) 80 without any wear region, the wear region(s) 86 without any void, and/or one or more other substrate defects.

Figure 6:
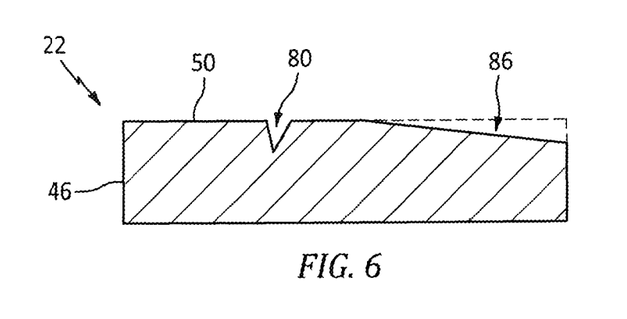

In step 404, referring to FIG. 6, the substrate 46 is prepared for the braze powder 44. A coating 88 (see FIG. 5) over at least a portion or an entirety of the substrate 46, for example, may be removed to expose the underlying substrate 46 and its substrate surface 50. The coating 88 may be removed using various techniques such as, but not limited to, chemical stripping, abrasive blasting, waterjet blasting and/or machining. In addition or alternatively, the void 80 may be machined (e.g., enlarged, smoothed, etc.), cleaned out and/or otherwise processed. This preparation step 404 may be performed by the machining device 28 and/or other devices part of or discrete from the manufacturing system 20.

In step 406, the substrate 46 is scanned using structured light; e.g., structured white or blue light. The scanning device 30 of FIG. 1, for example, scans the substrate 46 of FIG. 6 to map one or more exterior characteristics of the substrate 46 and/or one or more interior characteristic of the substrate 46. Examples of the exterior substrate characteristics include, but are not limited to, a surface geometry of, one or more dimensions of and/or one or more spatial coordinates for a portion (or multiple portions) of or an entirety of an exterior of the substrate 46. Examples of the interior substrate characteristics include, but are not limited to, a geometry of, one or more dimensions of and/or one or more spatial coordinates for a feature (or multiple features) projecting into the substrate 46; e.g., the opening to the void 80. The scanning device 30 then provides substrate scan data to the controller 32 indicative of the one or more mapped substrate characteristics. The substrate scan data may be in the form of a computer aided design (CAD) model file; e.g., a stereolithography (STL) model file.

In step 408, the substrate scan data is processed to provide additive manufacturing (AM) data. The controller 32 of FIG. 1, for example, may compare (e.g., align) the one or more mapped substrate 46 characteristics from the substrate scan data with respective characteristics from substrate reference data. This substrate reference data may be data input from (or derived from) a (e.g., original equipment manufacturer (OEM)) design specification for the component 22. In other words, the controller 32 may compare the one or more mapped characteristics for the substrate 46 being worked on (e.g., overhauled) to one or more corresponding characteristics of a (e.g., theoretical) design space component; e.g., a component formed according to the design specification. The controller 32, for example, may generate a solid model of the scanned substrate 46 to compare to a solid model of the design space component. The controller 32 may thereby evaluate the current state/condition of the substrate 46, and determine what additive operations may be performed (e.g., determine amount(s) of the braze powder to deposit, determine where to deposit the braze powder, determine path(s) to follow for the depositing of the braze powder, etc.) to place the substrate 46 of FIG. 6 into like new (or new) condition; e.g., to have the same (or similar) characteristics as the design space component. For example, the controller 32 may identify material deficits between the solid model of the scanned substrate 46 and the solid model of the design space component, and determine how to fill those material deficits with the braze powder. The additive manufacturing data may include one or more commands for the additive manufacturing device 24 to place the substrate 46 of FIG. 6 into the like new (or new) condition.

Figure 7:
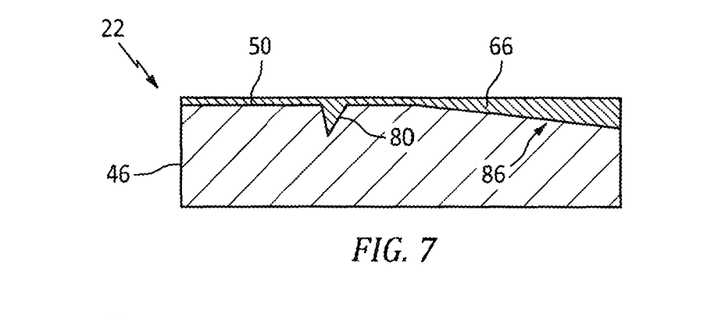

In step 410, referring to FIGS. 2 and 7, the braze powder is deposited with the substrate 46 using the additive manufacturing device 24. The additive manufacturing device 24, for example, may deposit the braze powder 44 onto the substrate surface 50 at or about the target point 60. The laser 40 may concurrently sinter this braze powder 44 at the target point 60 together and/or to the underlying substrate 46. The additive manufacturing device 24 may be positioned and operated to provide the sintered braze material 66 within the void 80; e.g., to partially or completely fill the void 80. The additive manufacturing device 24 may also or alternatively be positioned and operated to provide a cladding (e.g., a layer or multiple layers) of the sintered braze material 66 over the wear region 86; e.g., to build back worn away substrate material. The additive manufacturing device 24 may selectively deposit the braze powder over the substrate 46 such that (e.g., only) areas which need repair (and optionally areas adjacent and/or surrounding those areas) are filled with the sintered braze material 66 and/or coated with the sintered braze material 66. Of course, in other embodiments, the braze powder may be deposited over an entirety of the substrate 46 where excess material may later be removed. The braze powder may be deposited (e.g., built up) as one or more layers during the step 410.

The braze powder 44 may include a mixture of metal alloy powder (e.g., substrate powder) and braze material powder. The metal alloy powder may be selected to have a relatively high melting point and common (the same) or similar material properties as the substrate 46. The metal alloy powder, for example, may be made from a common (or a similar) material as the underlying substrate 46; e.g., an aluminum (Al) superalloy, a nickel (Ni) superalloy, a titanium (Ti) superalloy, etc. The braze material powder, on the other hand, may be selected to have a relatively low melting point, which is lower than the melting point of the metal alloy powder. The braze material powder, for example, may include a common or similar base element as the substrate 46 and/or the metal alloy powder (e.g., aluminum (Al), nickel (Ni) or titanium (Ti)) without the super alloying elements. The brazing powder may also include boron (B), silicon (Si) and/or other melting point suppressants which may help facilitate melting and diffusion of the metal alloy powder with the substrate 46. The present disclosure, however, is not limited to the foregoing exemplary braze materials.

The braze powder 44 may include various proportions of the metal alloy powder and the braze material powder. For example, the braze powder 44 may include more of the braze material powder than the metal alloy powder to fill voids within the substrate 46; e.g., to increase wettability, flowability and/or capillary penetration of the braze powder. On the other hand, the braze powder 44 may include more of the metal alloy powder than the braze material powder to form a cladding over the substrate 46. Still alternatively, the braze powder 44 may include the same amount of the metal alloy powder as the braze material powder.

Figure 8:
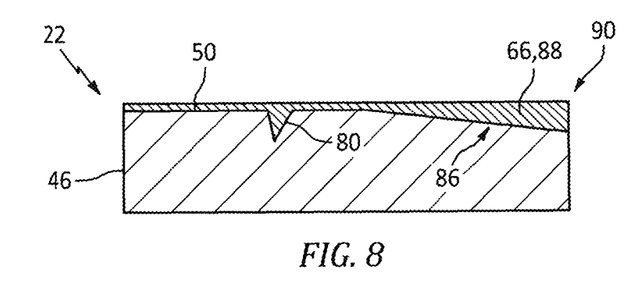

In step 412, referring to FIG. 8, the substrate 46 and the sintered braze material 66 are heated. The substrate 46 with the sintered braze material 66, for example, may be arranged within the treatment chamber 68 of the furnace 26 of FIG. 1. The furnace 26 may subject the substrate 46 with the sintered braze material 66 to a heat cycle. More particularly, the substrate 46 with the sintered braze material 66 may be heated to an elevated temperature within a partial pressure inert gas environment. The elevated temperature is selected such that the sintered braze material 66 melts and flows into defects of the substrate 46 by capillary action. Once the sintered braze material has melted, a relatively lower temperature may be selected and held in the same heat cycle for a duration. This sustained temperature may facilitate diffusion of the melting point suppressant material. This diffusion of the melting point suppressant material may facilitate athermal solidification, resulting in a braze diffusion bond of the sintered material to the substrate 46. The athermal solidification may describe solidification of the melted sintered braze material under, for example, a constant temperature. The diffusion duration may be between four (4) hours and twelve (12) hours, but may be much shorter or longer depending on materials being diffusion brazed and/or desired material properties and diffusion bonds to the substrate 46. This elevated temperature, however, is less than a melting point temperature of the substrate material. The elevated temperature for the braze melt, for example, may be between 1,500° F. and 2,500° F. The elevated temperature for the braze diffusion, for example, may be between 1,000° F. and 2,400° F. The inert gas environment may have a vacuum pressure range between, for example, 0.5 microns and 0.1 microns. The present disclosure, however, is not limited to the foregoing exemplary heat cycle parameters, and the foregoing heat cycle parameters may vary depending upon the specific material composition of the substrate 46 and the braze material, dimensions (e.g., thickness) of the sintered brazed powder, etc.

Following the heating step 412, braze filler material 88 (e.g., diffusion bonded braze material) of FIG. 8 may heal the void 80. The braze filler material 88, for example, may partially or completely fill the void 80. The braze filler material 88 may also or alternatively provide a cladding over the substrate 46 to restore a dimensional parameter of and/or reinforce the wear region 86. The braze filler material 88, for example, may buildup the wear region 86 back to or above a dimensional parameter specified therefor by a design specification or an overhaul specification for the component 22.

In step 414, a first object 90 (e.g., the substrate 46 with the braze filler material 88) is scanned using structured light. The scanning device 30 of FIG. 1, for example, scans the first object 90 of FIG. 8 to map one or more exterior characteristics of the first object 90 and/or one or more interior characteristic of the first object 90. Examples of the exterior first object characteristics include, but are not limited to, a surface geometry of, one or more dimensions of and/or one or more spatial coordinates for a portion (or multiple portions) of or an entirety of an exterior of the first object 90. Examples of the interior first object characteristics include, but are not limited to, a geometry of, one or more dimensions of and/or one or more spatial coordinates for a feature (or multiple features) projecting into the first object 90; e.g., a void. The scanning device 30 then provides first object scan data to the controller 32 indicative of the one or more mapped first object characteristics. The first object scan data may be in the form of a computer aided design (CAD) model file; e.g., a stereolithography (STL) model file.

In step 416, the first object scan data is processed to provide machining data. The controller 32 of FIG. 1, for example, may compare (e.g., align) the one or more mapped first object characteristics from the first object scan data with one or more respective mapped substrate characteristics from the substrate scan data; e.g., the pre-additive manufacturing scan data. The controller 32 may also or alternatively compare (e.g., align) the one or more mapped first object characteristics from the first object scan data with respective characteristics from other first object reference data. This other first object reference data may be data input from (or derived from) the design specification for the component 22. The controller 32 may thereby evaluate the current state/condition of the first object 90, and determine what subtractive operations may be performed (e.g., amounts of material to be removed, where to remove the material, path(s) for the machining tool 74 to follow, etc.) to place the first object 90 of FIG. 8 into like new (or new) condition; e.g., to have the same (or similar) characteristics as the design space component. The additive manufacturing data may include one or more commands for the machining device 28 to place the first object 90 of FIG. 8 into the like new (or new) condition.

Figure 9:
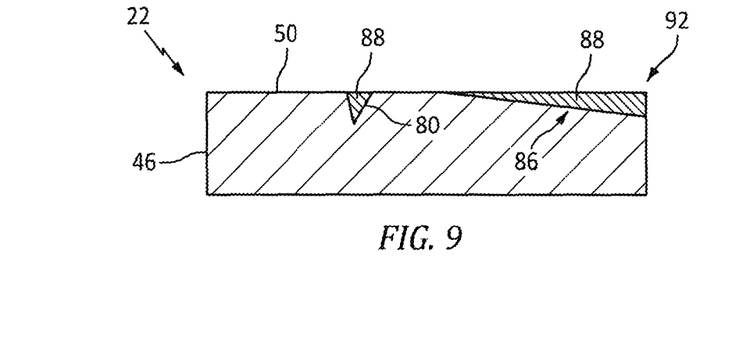

In step 418, referring to FIG. 9, a second object 92 is formed. The machining device 28 of FIG. 3, for example, selectively removes material from the first object 90 to form the second object 92. This first object material is removed based on/according to the machining data; e.g., command(s) provided by the controller 32. The first object material may thereby be selectively removed to at least partially restore or otherwise place the component 22 into the like new (or new) condition. The material removed from the first object 90 may include some of the braze filler material 88 and/or some of the substrate material. This material may be removed by the machining device 28 through drilling, cutting, grinding, milling, polishing, sanding and/or otherwise.

Figure 10:
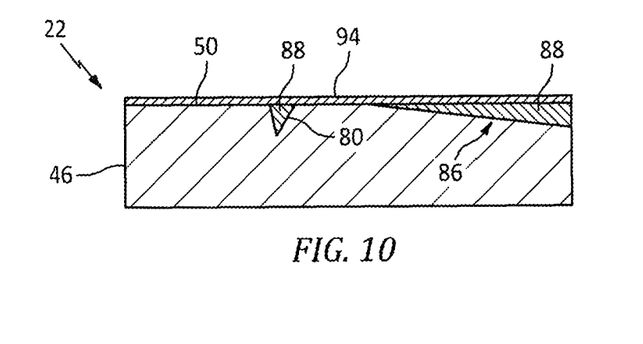

In step 420, referring to FIG. 10, the second object 92 may be processed to provide an overhauled/restored component. One or more coatings 94, for example, may be applied to the second object 92 (see FIG. 10). Examples of these coatings 94 include, but are not limited to, bond coating(s), environmental coating(s), thermal barrier coating(s), etc.

In some embodiments, referring to FIG. 2, the braze powder 44 and the laser beam 62 may be concurrently directed to the common target point 60 for the braze powder deposition. In other embodiments, however, the laser beam 62 may alternatively be directed to a different target point than the braze powder 44. The laser beam target point, for example, may alternatively be spaced from and follow the braze powder target point.

In some embodiments, the braze powder 44 may be sintered using the laser beam 62. The present disclosure, however, is not limited to use of such an exemplary energy beam. The braze powder 44, for example, may alternatively be sintered using an electron beam provided by an electron beam source. Furthermore, multiple energy beams (e.g., laser beams and/or electron beams) may be used for sintering the braze powder 44. In addition or alternatively, multiple nozzles 38 may be used to deliver the braze powder 44.

A component manufactured using a typical additive laser deposition welding process may be subject to: internal stresses thermally induced by relatively high welding temperatures (e.g., temperatures high enough to melt the substrate material); thermally induced distortion and/or warping; and/or reduction in material density caused by, for example, dendritic voids. By contrast, sintering the braze powder 44 with the substrate 46 and then diffusion bonding the braze powder with the substrate 46 as described above subjects the substrate 46 to relatively low processing temperatures, compared to welding temperatures. The manufacturing methods of the present disclosure may thereby reduce or eliminate: thermally induced stresses; thermally induced distortion and/or warping; and/or reduction in material density associated with additive laser deposition welding techniques. The above laser braze cladding technique is also paired with the adaptive processing to reduce material consumption and/or require less post processing (e.g., machining, finishing, etc.) compared to traditional manual brazing techniques.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for providing a component, comprising:
additively depositing braze powder with a substrate, the braze powder sintered together during the depositing of the braze powder to provide the substrate with sintered braze material;

heating the sintered braze material to melt the sintered braze material and diffusion bond the sintered braze material to the substrate to provide braze filler material;

scanning a first object using structured light to provide first object scan data, the first object comprising the substrate and the braze filler material diffusion bonded to the substrate;

comparing the first object scan data to first object reference data to provide machining data; and machining the first object using the machining data to provide a second object.

2. The method of claim 1, wherein the structured light comprises structured white light.

3. The method of claim 1, wherein the structures light comprises structured blue light.

4. The method of claim 1, wherein the braze powder is deposited using an additive manufacturing device.

5. The method of claim 1, further comprising:
scanning the substrate using structured light to provide substrate scan data;
comparing the substrate scan data to substrate reference data to provide additive manufacturing data; and
the braze powder deposited with the substrate based on the additive manufacturing data.

6. The method of claim 5, wherein the substrate reference data comprises data from a design specification for the component.

7. The method of claim 5, wherein the first object reference data comprises the substrate scan data.

8. The method of claim 1, wherein the depositing of the braze powder includes
directing the braze powder towards the substrate through a nozzle; and
sintering the braze powder using a laser beam.

9. The method of claim 8, wherein the laser beam is directed towards the substrate through an inner bore of the nozzle.

10. The method of claim 1, wherein the machining removes some of the braze filler material diffusion bonded to the substrate.

11. The method of claim 1, wherein the braze powder comprises metal alloy powder and braze material powder with a lower melting point than the metal alloy powder.

12. The method of claim 11, wherein the metal alloy powder and the substrate comprises a common metal alloy.

13. The method of claim 1, wherein the heating of the sintered braze material is performed in a vacuum furnace subsequent to the depositing of the braze powder.

14. The method of claim 1, wherein the braze powder is deposited with the substrate to form a cladding over the substrate.

15. The method of claim 1, further comprising:
receiving a damaged component previously installed within an engine; and
the depositing, the heating and the machining performed to repair the damaged component to provide the component.

16. The method of claim 1, further comprising depositing a coating on the second object.

17. A method for providing a component, comprising:
scanning a substrate using a structured light device to provide substrate scan data;
comparing the substrate scan data to substrate reference data to provide additive manufacturing data;
depositing braze powder with the substrate using an additive manufacturing device based on the additive manufacturing data, the braze powder sintered to provide the substrate with sintered braze material;
heating the sintered braze material to melt the sintered braze material and diffusion bond the sintered braze material to the substrate to provide braze filler material;
scanning a first object using the structured light device to provide first object scan data, the first object comprising the substrate and the braze filler material diffusion bonded to the substrate;
comparing the first object scan data to first object reference data to provide machining data; and
machining the first object using the machining data to provide a second object.

18. The method of claim 17, wherein the substrate reference data comprises data from a specification for the component.

19. The method of claim 17, wherein the first object reference data comprises the substrate scan data.

20. A system for providing a component comprising a substrate, the system comprising:
a scanning device configured to scan the substrate using structured light to provide substrate scan data indicative of one or more characteristics of the substrate, and the scanning device further configured to scan a first object using the structured light to provide first object scan data indicative of one or more characteristics of the first object;
a controller configured to compare the substrate scan data to substrate reference data to provide additive manufacturing data, and the controller configured to compare the first object scan data to first object reference data to provide machining data;
an additive manufacturing device configured to deposit braze powder with the substrate based on the additive manufacturing data, the braze powder sintered using a laser of the additive manufacturing device during the depositing of the braze powder to provide the substrate with sintered braze material;
a furnace configured to melt the sintered braze material to facilitate diffusion bonding of the sintered braze material to the substrate to provide the first object; and
a machining device configured to machine the first object based on the machining data.

* * * * *